United States Patent [19]
Blackmon

[11] Patent Number: 5,581,516
[45] Date of Patent: Dec. 3, 1996

[54] LOW POWER TRANSMITTER PROVIDING SELECTABLE WAVEFORM GENERATION

[75] Inventor: Fletcher A. Blackmon, Forestdale, Mass.

[73] Assignee: The United States of America as represented by the Secretary of the Navy, Washington, D.C.

[21] Appl. No.: 499,338

[22] Filed: Jul. 7, 1995

[51] Int. Cl.$^6$ .................................................. H04B 1/02
[52] U.S. Cl. ............................................................ 367/137
[58] Field of Search ..................................... 367/137, 138, 367/903

[56] References Cited

U.S. PATENT DOCUMENTS

| | | | |
|---|---|---|---|
| 4,042,904 | 8/1977 | Cobb | 367/137 |
| 4,049,953 | 9/1977 | Evans, Jr. | 367/137 |
| 5,054,039 | 10/1991 | Blackmon et al. | 377/42 |
| 5,073,878 | 12/1991 | Gilchrist | 367/137 |

*Primary Examiner*—Ian J. Lobo
*Attorney, Agent, or Firm*—Michael J. McGowan; Prithvi C. Lall; Michael F. Oglo

[57] ABSTRACT

A low power transmitter providing selectable waveforms includes a self-contained power source, such as a battery. A timer powered by the battery provides a transmitter actuation signal after a predetermined delay. A voltage regulator coupled to the power source and to the timer provides power in response to the transmitter actuation signal. A waveform generator coupled to the voltage regulator provides one or more selected continuous or pulse waveforms when power is supplied by the voltage regulator. The waveform generator is pre-programmed with one or more selected continuous or pulse waveforms in digital format. The waveform generator outputs at least one selected waveform selected when power is provided by the voltage regulator. Any waveform may be selected by appropriately programming the waveform generator. Signal conditioners, coupled to the waveform generator and the voltage regulator, convert the one or more selected waveforms that are output in unfiltered analog format by the waveform generator into corresponding waveforms in analog format. An amplifier, coupled to the voltage regulator and to the signal conditioners, amplifies the one or more selected waveforms in analog format when power is provided by the voltage regulator. A transducer is coupled to the amplifier for acoustically radiating the selected waveforms in analog format in a marine environment.

15 Claims, 6 Drawing Sheets

5,581,516

LOW POWER TRANSMITTER PROVIDING SELECTABLE WAVEFORM GENERATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field Of The Invention

The present invention relates to a transmitter circuit, and more particularly, to a low power transmitter providing selectable waveform generation.

2. Description of the Prior Art

The Submarine Underwater Communication Program (SUCP) of the Range Technology Development Program (RTDP), among other applications, calls for a transmitter capable of outputting one or more selectable pulse and/or CW waveforms. In addition, such a transmitter needs to be compact and low power when it is to serve as the signal source section for an application in a deep water environment where the use of battery power is dictated.

In the past, circuits, sometimes referred to as "pingers", were used to generate certain, predetermined types of signals for acoustic transmission, communication, tracking and channel modeling. However, these circuits are limited in that each pinger could not transmit a signal different than its predetermined signals without changing its circuitry. Costly, time-consuming design, development and testing of a new, or modified, pinger circuit was thus required for each different signal to be transmitted.

SUMMARY OF THE INVENTION

Accordingly, it is the principal object of the present invention to provide a low power transmitter providing selectable waveforms. The low power transmitter providing selectable waveforms of the present invention includes a self-contained power source, such as a battery; a timer powered by the battery for providing a transmitter actuation signal after a predetermined delay; a voltage regulator coupled to the battery and to the timer for providing power in response to the transmitter actuation signal; and a waveform generator coupled to the voltage regulator for providing any selected one or more continuous pulse waveforms when power is supplied thereto by the voltage regulator.

In the preferred embodiment, the waveform generator is preprogrammed with one or more selected continuous or pulse waveforms in unfiltered analog format. The waveform generator outputs the one or more waveforms selected when power is provided by the voltage regulator. Any waveform may be selected by appropriately programming the waveform generator.

Signal conditioners, coupled to the waveform generator and the voltage regulator, convert the one or more selected waveforms that are output in unfiltered analog format by the waveform generator into corresponding waveforms in analog format. An amplifier, coupled to the voltage regulator and to the signal conditioners, amplifies the one or more selected pulse or continuous waveforms in analog format when power is provided by the voltage regulator. A transducer is coupled to the amplifier for acoustically radiating the selected waveforms in analog format in a marine environment.

According to one aspect of the present invention, the waveform generator may be pre-programmed with any selected one or more pulse and/or continuous waveforms in digital format. Different waveforms are pre-programmed in the waveform generator enabling the transmission in the acoustic environment of the waveforms selected without the disadvantage of hardware modifications as in the prior art "pinger" circuits.

According to another aspect of the present invention, the waveform generator, signal conditioners and amplifier of the transmitter are powered by the voltage regulator only after the predetermined interval of the transmitter actuation signal has elapsed, thereby ensuring low power usage, which is advantageous in deep water applications. In addition, the transmission events are preprogrammed in the microcontrol.

BRIEF DESCRIPTION OF THE DRAWINGS

These and other objects and aspects of the present invention will become apparent as the invention becomes better understood by referring to the following detailed description of the preferred embodiment thereof, and to the drawings, wherein.

DETAILED DESCRIPTION OF THE PREFERRED EMBODIMENT

Figure 1:
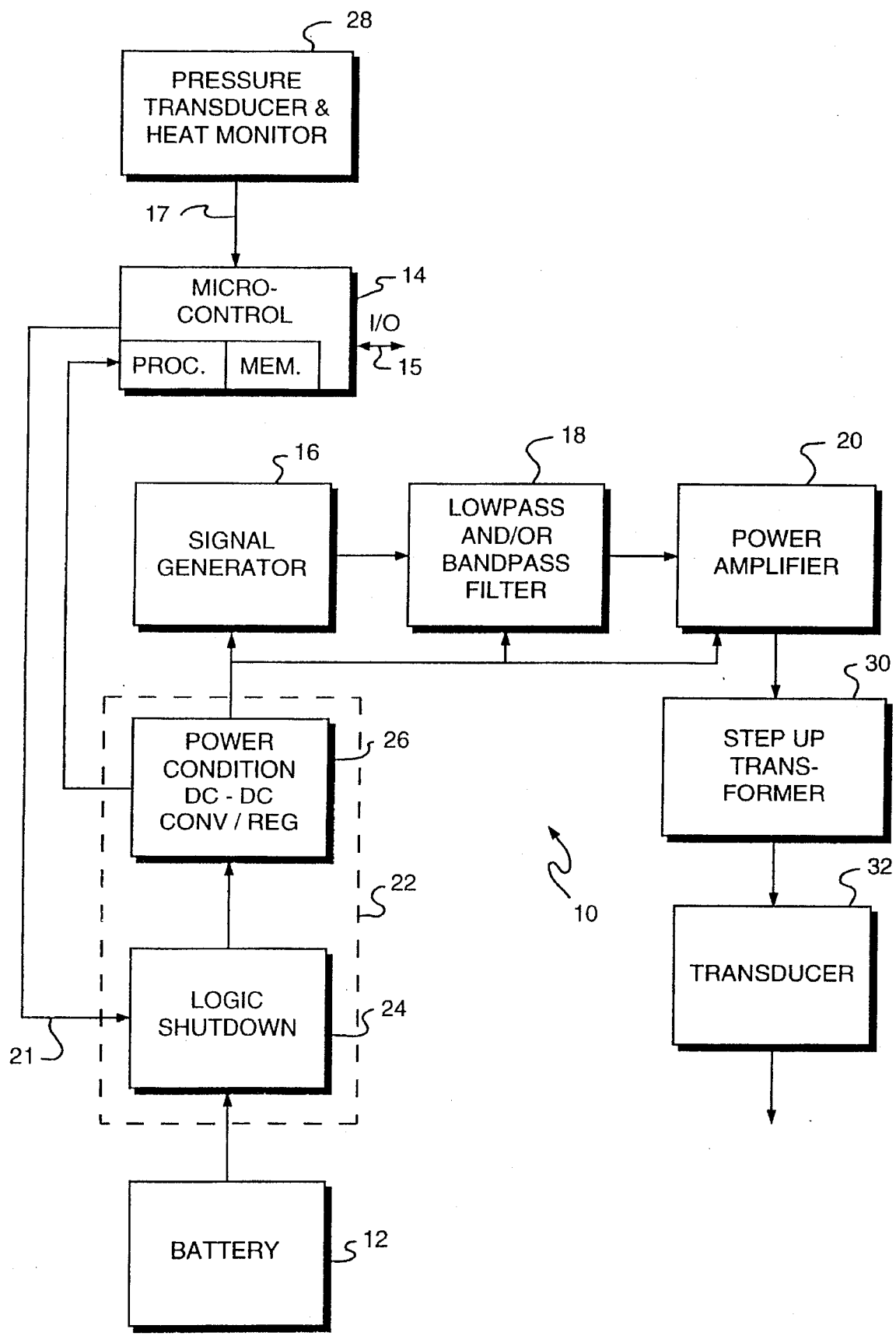
FIG. 1 is a block diagram of the low power transmitter providing selectable waveforms of the present invention.

Referring now to FIG. 1, generally designated at 10 is a block diagram of the low power transmitter providing selectable waveforms of the present invention. The transmitter 10 includes battery 12, preferably a lead-acid rechargeable battery providing twenty-four (24) volts at thirty-eight (38) amp hours, connected to microcontroller 14, signal generator 16, low pass and/or band pass filter 18 and power amplifier 20 via power distribution network illustrated by dashed box 22. Power distribution network 22 includes a logic shut-down circuit 24, controlled by microcontroller 14, and a power conditioning DC-DC converter/regulator 26. The power conditioning DC-DC voltage converter/regulator 26 always provides power to the microcontroller 14 and powers the signal generator 16, the low pass and/or band pass filter 18 and the power amplifier 20 when the same are enabled by a transmitter actuation signal 21 to be further described below, that is provided by the microcontroller 14 to the logic shut-down circuit 24. The transmitter actuation signal activates the power conditioning DC-DC converter/regulator 26 to supply power to the signal generator 16, low pass and/or band pass filter 18, and power amplifier 20. The transmitter 10 thereby does not need to be fully and continuously energized, thereby conserving its battery power.

The microcontroller 14 includes a microprocessor and a data store, as well as an I/O bus 15, preferably a RS232 interface, and various output control lines and input lines as is well known in the art. The microcontroller 14 is always supplied with power by the power distribution network 22. It is programmed with a pre-programmed with multiple event times to produce a transmitter actuation signal 21 to the logic shut-down circuit 24 after predetermined intervals. The pre-programmed delay may be input via the I/O bus 15.

When the transmitter actuation signal 21 is received by the logic shut-down circuit 24 of the power distribution network 22, the logic shut-down circuit 24 toggles the power conditioning DC-DC converter/regulator 26 to supply power to the signal generator 16, the filter 18 and power amplifier 20. The transmitter actuation signal 21 is preferably provided to the logic shut-down circuit 24 via one of the output control lines of the microcontroller 14.

A pressure transducer and heat monitor 28 are coupled to the microcontroller 14. The pressure transducer is preferably connected to the microcontroller 14 via one of its input lines and pressure data is stored in microcontroller 14 memory at predetermined intervals pre-programmed by the microcontroller 14. The pressure data enables the transmitter to determine the depth (in a marine environment) at which the low power transmitter providing selectable waveforms 10 is operative.

The heat monitor 28 is provided to sense the temperature of the power amplifier 20, preferably a thermistor mounted proximate the power amplifier 20, whose signal is stored in the memory of the controller 14 via one of its input lines. The microcontroller 14 responds to the signal provided by the heat monitor under programmed control to interrupt power to the signal conditioner 16, low pass and/or band pass filter 18 and power amplifier 20 in the event that the heat generated by the power amplifier 20 exceeds a predetermined threshold. Should the heat exceed the pre-programmed threshold, the microcontroller 14 is operative, in the preferred embodiment, to output, via one of its output control lines, a transmitter disable signal to the logic shut-down circuit 24 of the power distribution network 22.

Signal generator 16 includes a processor and a data store that is pre-programmed to provide any selected pulse and/or continuous wave waveform in digital format and is disclosed in U.S. Pat. No. 5,054,039 to Blackmon, et al., entitled Digital Calibration Circuit Employing Composite Sign Wave Signals, incorporated herein by reference. It will be appreciated that although the waveform generator of the Blackmon, et al. patent is presently preferred, other signal generators capable of storing pre-programmed pulse and/or continuous waveforms may be employed without departing from the scope of the present invention.

When power is applied to the signal generator 16 by the transmitter actuation signal of the microcontroller 14 which in turn toggles the power conditioning DC-DC converter/regulator 26 into its "on" condition, the signal generator outputs, in digital format, the selected one or more pulse and/or continuous waveforms pre-programmed in its memory to the low pass and/or band pass filter 18. The filter 18, in turn, converts the signal output by the signal generator 16 in digital format into a corresponding signal in analog format. The power amplifier 20, in turn, amplifies the signal in analog format and provides it to a step up transformer 30, preferably a one to ten step up transformer, which further boosts its voltage. A transducer 32 is coupled to the step up transformer 30 for acoustically radiating the voltage boosted selected one or more continuous and/or pulse waveforms in analog format into a marine environment.

Figure 2A:
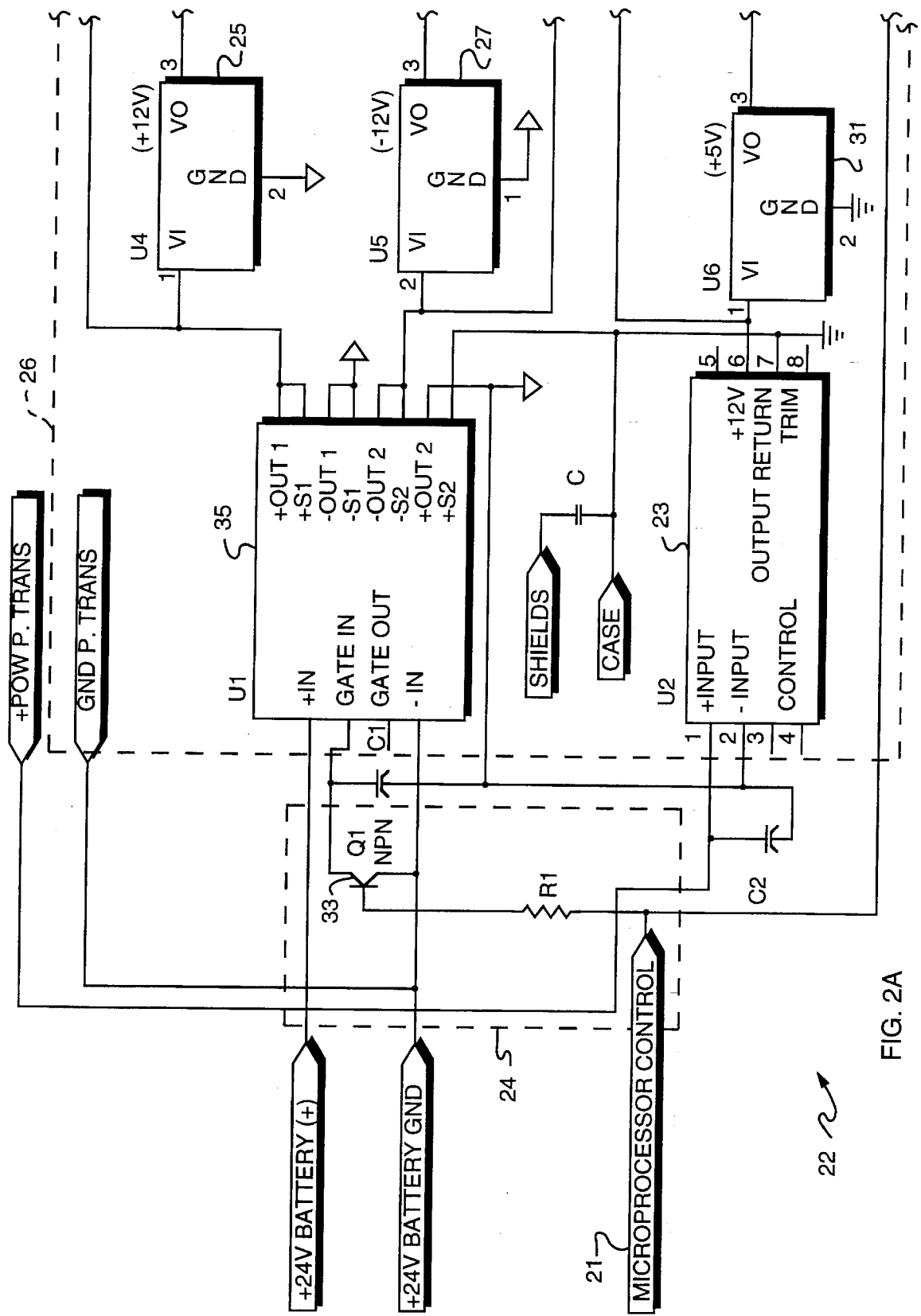
FIGS. 2A and 2B are more detailed schematic representations of the power distribution network of FIG. 1.
Figure 2B:
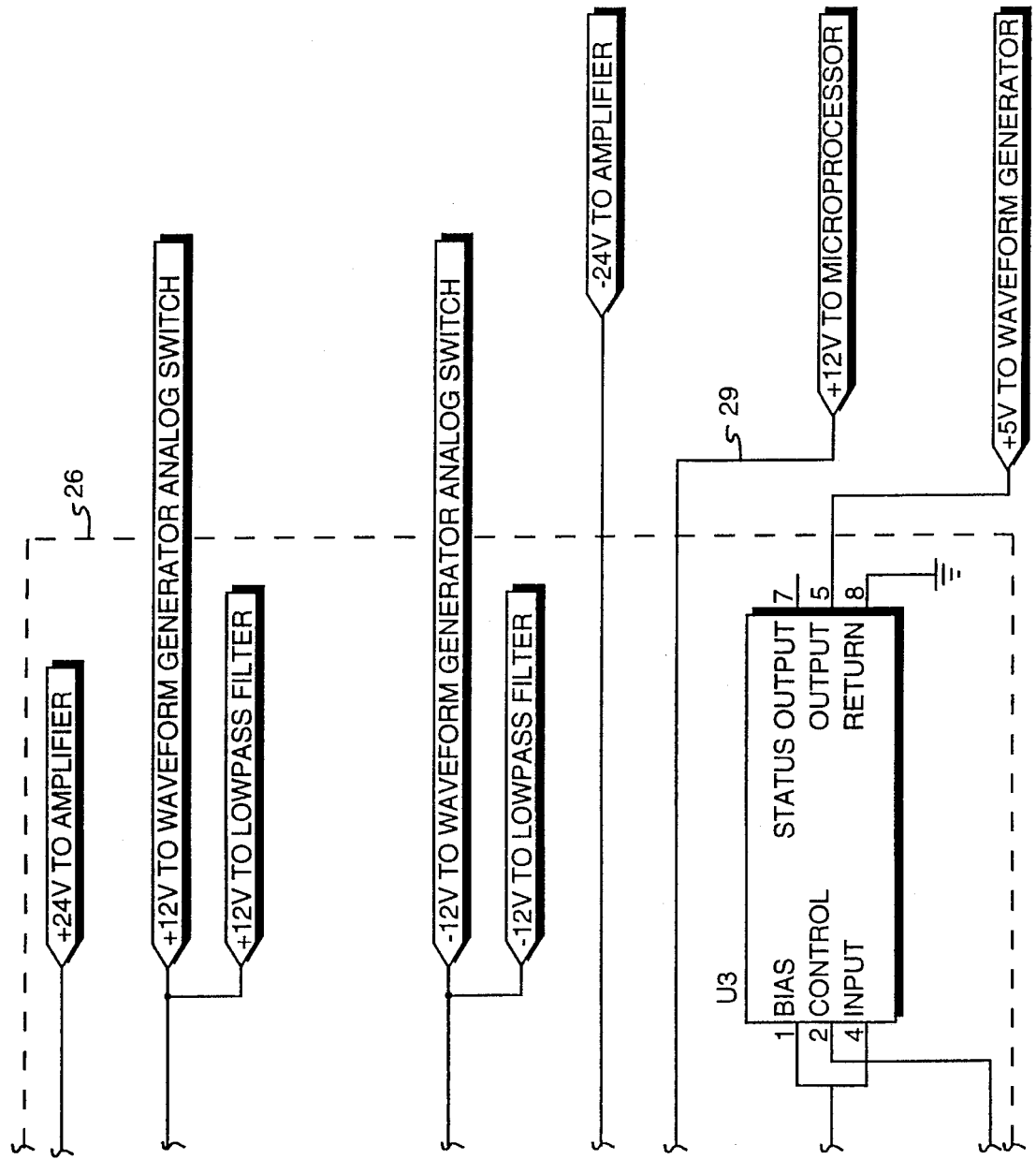

Referring now to FIGS. 2A and 2B, generally designated at 22, are more detailed schematic representations of the power conditioning network 22 of the low power transmitter providing selected waveforms of the present invention. Battery power from a battery, not shown, is supplied in parallel to two voltage regulators 35 and 23, a twenty-four (24) and a twelve (12) volt voltage regulator respectively, in the preferred embodiment.

In the preferred embodiment, the voltage regulator 35 is a Vicore dual output DC-DC converter which supplies positive and negative twenty-four (24) volts at a power rating of one hundred (100) watts for each output. The output of voltage regulator 35 supplies power to the power amplifier 20 (FIG. 1), to a twelve-volt regulator 25 and a negative twelve-volt regulator 27. The regulators 25 and 27 power the waveform generator 16 (FIG. 1) as well as an active eight pole low pass filter of the low pass and/or band pass filter 18 (FIG. 1).

The voltage regulator 23 has a single twelve (12) volt output 29 which is used to continuously supply plus and minus five (5) volts to the microcontroller 14 (FIG. 1). The voltage regulator 23 also supplies power to voltage regulator 31 which supplies power to the waveform generator 16 (FIG. 1). Voltage regulator 23 is continuously energized while voltage regulator 35 is switched. It will be appreciated that although twenty-four (24), twelve (12) and five (5) voltage regulators are employed in the power distribution circuit 22, other voltages and voltage regulating devices may be employed without departing from the scope of the present invention.

The microcontroller transmitter actuation signal 21 (and deactuation signal) is coupled to the voltage regulator 35 and via transistor 33. The transistor 33 provides a switch that allows the microcontroller 14 (FIG. 1) to turn the transmitter on and off with TTL logic levels.

Figure 3:
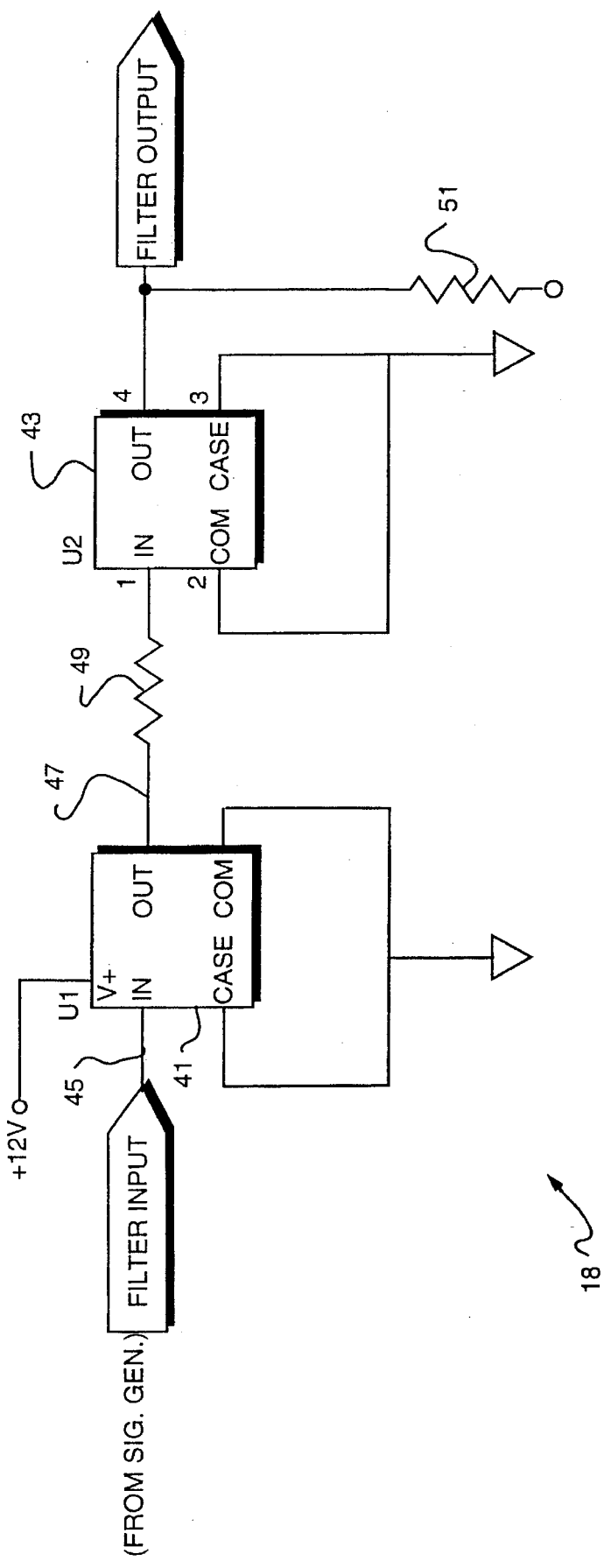
FIG. 3 is a schematic diagram of the filter of FIG. 1.

Referring now to FIG. 3, generally designated at 18 is a schematic circuit diagram of one implementation of the low pass and/or band pass filter of the low power transmitter providing selectable waveforms of the present invention. The filter 18 is comprised, in the exemplary embodiment, of two filters 41 and 43. The first filter 41 is preferably an eight (8)-pole active, low power, Butterworth low pass filter with a three (3) dB frequency of approximately fifteen (15) kilohertz. The output 45 of the signal generator 16 (FIG. 1), which in the preferred embodiment has a voltage swing from zero to 2.55 volts is passed through this filter to attenuate high frequency components due to harmonics of the waveforms produced, one hundred (100) kilohertz sampling frequency and DC-DC converting switching frequencies. The output 47 of the filter 41 is passed to the second filter 43, which is a passive, wide band pass filter whose pass band is preferably seven to fifteen kilohertz. Filter 43 is used to provide additional high frequency rejection, as well as to eliminate low frequency components and DC offset. The effect of filtering the analog output 45 of the signal generator 16 (FIG. 1) is to produce a clean analog waveform with zero (0) DC offset. In the preferred embodiment the passive filter's output is down six (6) dB from the input. Matching resistors 43 and 51 form a voltage divider at the filter's input and output.

Figure 4:
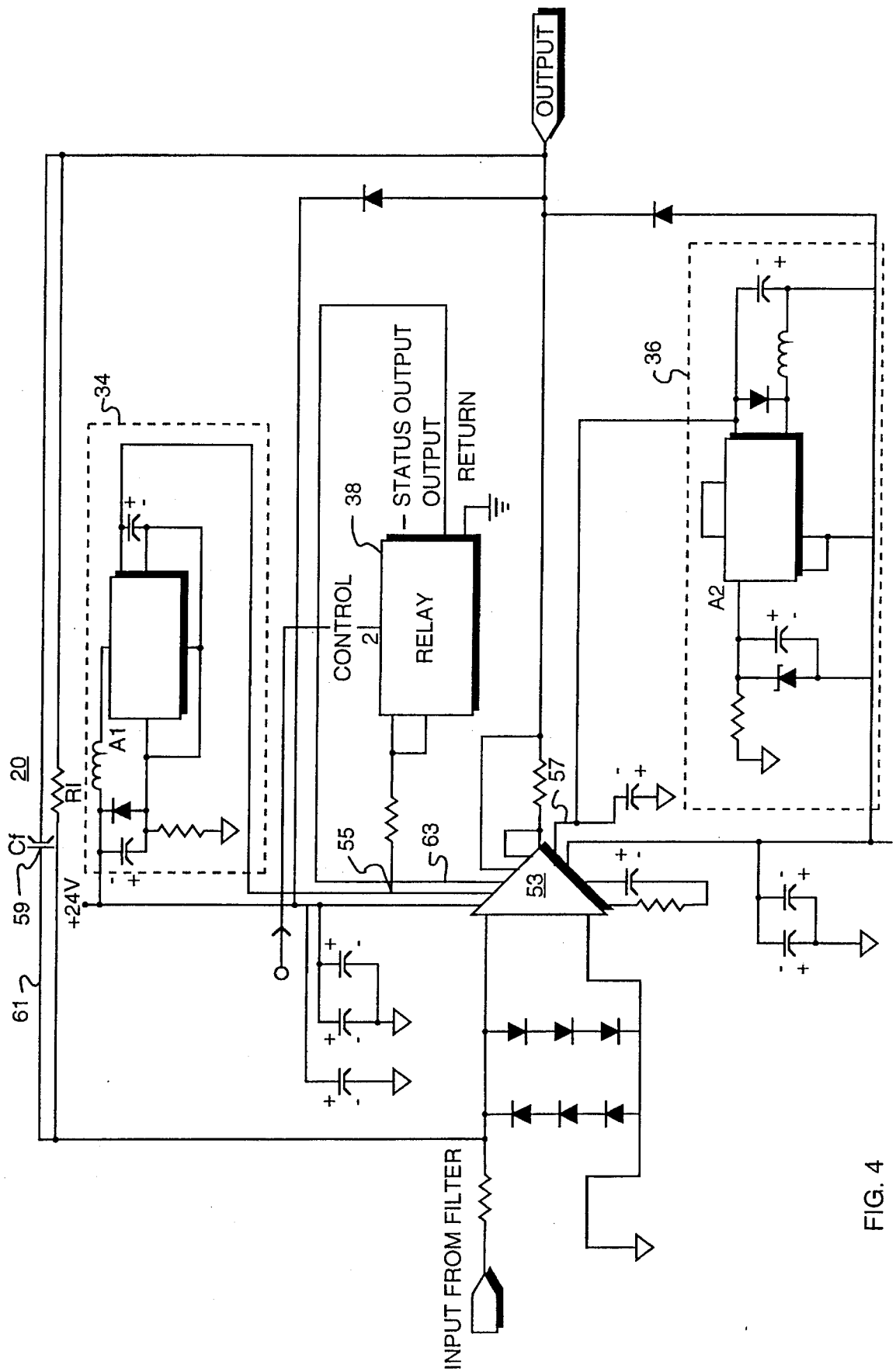
FIG. 4 is a schematic circuit diagram of the power amplifier of FIG. 1.

Referring now to FIG. 4, generally designated at 20 is a schematic diagram of the power amplifier circuit of the low power transmitter providing selectable waveforms of the present invention. In the preferred embodiment, the power amplifier 53 is an Apex PA04A power operational amplifier, although other amplifiers that provide both continuous output as well as pulse output may be employed without departing from the inventive concepts. The amplifier 53 is powered with negative and positive twenty-four (24) volts in the preferred embodiment. Two boost voltage inputs 55 and 57 are connected to respective voltage boost circuits 34, 36 of well-known design. In the preferred embodiment, the voltage of amplifier 53 is thereby set to positive and negative twenty-nine (29) volts. Amplifier 51 is thus used as an inverting amplifier that provides approximately thirty (30) dB of gain. Preferably, a one hundred (100) pF capacitor 59 is included in the amplifier's feedback path 61 to act as a low pass filter, approximately fifty (50) kHz at three (3) dB, and to provide amplifier stability. The gain of the amplifier in the preferred embodiment provides forty (40) volts peak to peak or fourteen (14) volts RMS with an input voltage to the filter 18 (FIG. 1) of 2.55 volts peak to peak.

Amplifier 53 is equipped with a current limit capability as well as a low power sleep mode operation capability. The current limit is set by selecting the value of a current resistor based on the safe operating limits of the amplifier. Normally, the amplifier 53 requires ninety (90) mA quiescent current from each supply to properly operate. In the sleep mode, the amplifier in the preferred embodiment draws five (5) nA of quiescent current from each supply. This mode of operation may be used to conserve battery power.

The sleep mode of operation may be enabled by connecting the positive voltage boost input 55 of the amplifier 53 to the sleep mode input 63, via relay 38. The start signal bit of the microprocessor of the waveform generator 16 (FIG. 1) could then be used to toggle the relay 38, and thereby the sleep mode between on and off conditions. Normally, the amplifier 53 is maintained in sleep mode, but just as the waveform generator is ready to output the signal, the sleep mode can be disabled and the normal mode of operation can be enabled until a complete waveform has been transmitted. Once this occurs, sleep mode is re-enabled. This process could continue under program control until the entire sequence of stored signals in the waveform generator 16 (FIG. 1) is transmitted.

Figure 5:
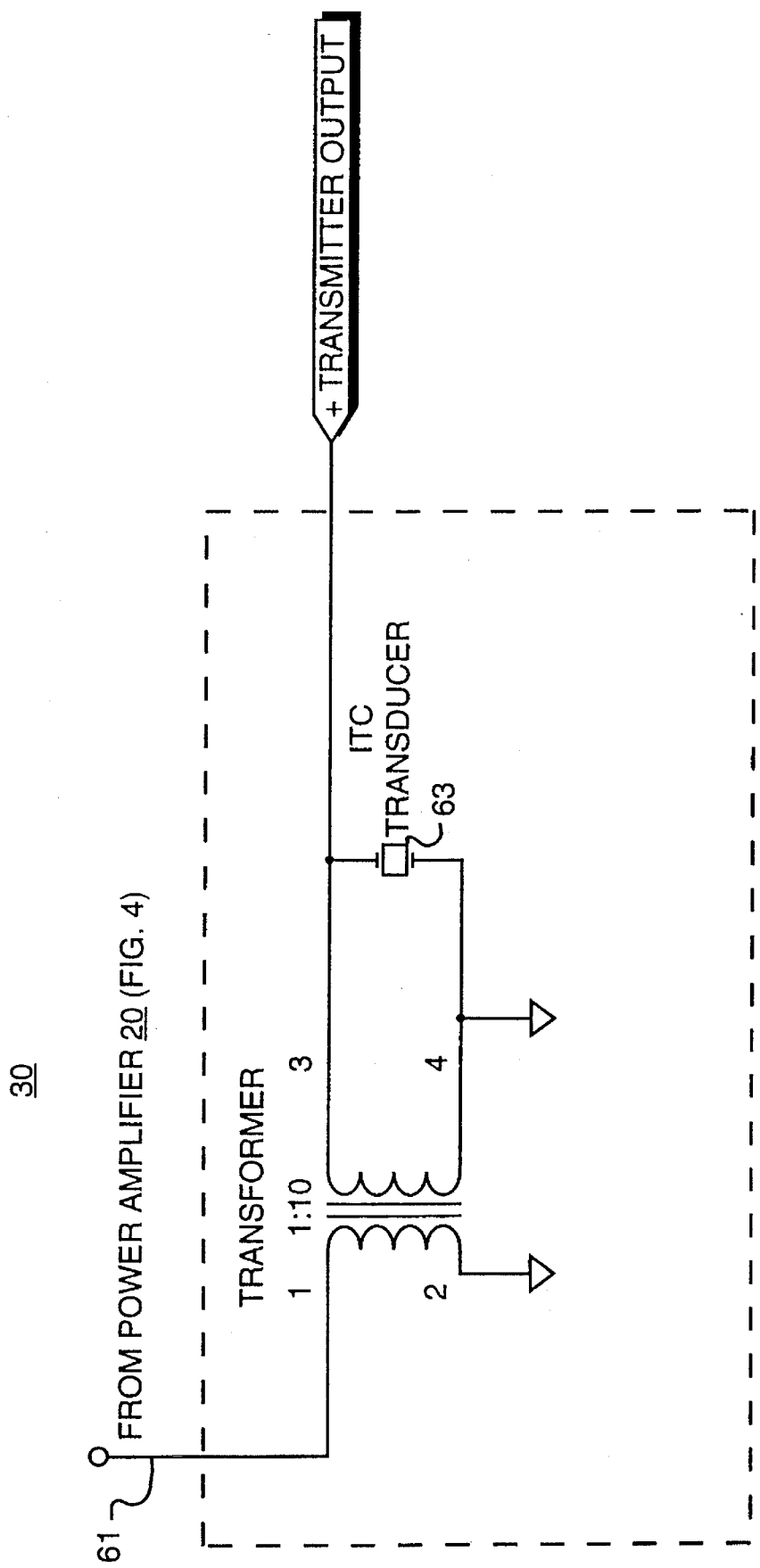
FIG. 5 is a schematic circuit diagram of the step up transformer of FIG. 1.

Referring now to FIG. 5, generally designated at 30 is a schematic circuit diagram of the step up transformer of the low power transmitter providing selectable waveforms of the present invention. The transformer 30 preferably is a one to ten (1:10) step up transformer that steps up the input voltage at the output by a factor of ten (10). The output of the transformer in the preferred embodiment is four hundred (400) volts peak to peak or one hundred and forty (140) volts RMS. In the preferred embodiment, the output capacity of the transformer is thirty (30) EA. The output of the transformer, preferably a Magnetico 15210, is coupled to a transmitting element such as a hydrophone, such as the ITC transducer 63 illustrated. The useful frequency range of operation of the transducer is from eight (8) kHz to sixteen (16) kHz. The transducer's horizontal pattern is omnidirectional and its vertical pattern is toroidal.

Many modifications of the presently disclosed invention will become apparent to those of skill in the art without departing from the scope of the appended claims.

What is claimed is:

1. A low power transmitter providing selectable waveforms, comprising:

a power source;

a timer, coupled to and powered by the power source, for providing a transmitter actuation signal after a predetermined delay;

a power distribution network for providing power in response to said transmitter actuation signal;

a programmable waveform generator, coupled to the power distribution network, and preprogrammed with at least one selected waveform in digital format, for providing the selected waveform when power is provided by the power distribution network;

a signal conditioner, coupled to the power distribution network and to the programmable waveform generator, for converting the at least one selected waveform in digital format into corresponding waveforms in analog format when power is provided by the power distribution network;

an amplifier, coupled to the power distribution network and to the signal conditioner, for amplifying the at least one selected waveform in analog format when power is provided by the power distribution network; and a transducer, coupled to the amplifier, for acoustically radiating the amplified at least one selected waveform in analog format into a marine environment.

2. The transmitter of claim 1 wherein said timer is a programmable timer and wherein said predetermined delay are programmed delay.

3. The transmitter of claim 2 wherein said programmable timer includes a processor having a memory, input lines and output control lines, and wherein said processor outputs said transmitter actuation signal on one of said output control lines.

4. The transmitter of claim 3 wherein said processor input lines include an I/O bus over which said predetermined interval of the programmed delay of the transmitter actuation signal may be set.

5. The transmitter of claim 3 further including a temperature sensor, coupled to at least one of the input lines of the processor, and wherein said processor is operative, under program control, to deactivate the transmitter actuation signal should the temperature sensed by the temperature sensor exceed a programmed threshold.

6. The transmitter of claim 3 further including a pressure sensor, coupled to at least one of the input lines of the processor, and wherein said processor is operative, under programmed control, to store in its memory data representative of the pressure at which the transmitter is operative.

7. The transmitter of claim 1 wherein said power distribution network includes a voltage regulator having a control input and a switch connected to the control input, and wherein said switch is toggled on and off by said transmitter actuation signal.

8. The transmitter of claim 1 wherein said signal conditioner includes an active filter coupled to said power distribution network.

9. The transmitter of claim 1 wherein said signal conditioner includes a passive filter.

10. The transmitter of claim 1 wherein said amplifier includes a current limit resistor.

11. The transmitter of claim 1 wherein said amplifier includes a sleep mode capability.

12. The transmitter of claim 1 further including a step-up transformer coupled between said amplifier and said transducer.

13. The transmitter of claim 1 wherein said power source includes a battery.

14. The transmitter of claim 1 wherein said at least one selected digital format waveform includes a power waveform.

15. The transmitter of claim 1 wherein said at least one selected digital format waveform includes a continuous waveform.

* * * * *